US006502032B1

(12) United States Patent
Newman

(10) Patent No.: US 6,502,032 B1
(45) Date of Patent: Dec. 31, 2002

(54) GPS URBAN NAVIGATION SYSTEM FOR THE BLIND

(75) Inventor: George H. Newman, Niceville, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/891,863

(22) Filed: Jun. 25, 2001

(51) Int. Cl.⁷ .............................................. G09B 21/00
(52) U.S. Cl. ....................... 701/213; 345/156; 345/158; 345/702; 345/725
(58) Field of Search ......................... 701/213; 345/156, 345/158, 163, 702, 729; 340/949, 925, 944; 342/24, 357.14, 357.17

(56) References Cited

U.S. PATENT DOCUMENTS

| | | | |
|---|---|---|---|
| 4,694,494 A | 9/1987 | Woolfson | 704/260 |
| 4,731,613 A | 3/1988 | Endo et al. | 342/357.14 |
| 5,032,836 A | 7/1991 | Ono et al. | 340/825.71 |
| 5,043,736 A * | 8/1991 | Darnell et al. | 342/357.1 |
| 5,117,363 A | 5/1992 | Akiyama et al. | 701/208 |
| 5,119,301 A | 6/1992 | Shimizu et al. | 701/217 |
| 5,189,430 A | 2/1993 | Yano et al. | 342/457 |
| 5,244,288 A | 9/1993 | Nagaoka | 400/109.1 |
| 5,293,464 A | 3/1994 | Hirano | 358/1.1 |
| 5,343,399 A | 8/1994 | Yokoyama et al. | 701/211 |
| 5,345,388 A | 9/1994 | Kashiwazaki | 701/213 |
| 5,371,497 A | 12/1994 | Nimura et al. | 340/995 |
| 5,453,012 A | 9/1995 | Hudecek | 434/114 |
| 5,470,233 A * | 11/1995 | Fruchterman et al. | 434/112 |
| 5,580,251 A | 12/1996 | Gilkes | 434/113 |
| 5,685,721 A | 11/1997 | Decker | 434/114 |
| 5,733,127 A * | 3/1998 | Mecum | 434/113 |
| 6,067,046 A * | 5/2000 | Nichols | 342/357.14 |
| 6,148,261 A * | 11/2000 | Obradovich et al. | 701/208 |
| 6,278,441 B1 * | 8/2001 | Gouzman et al. | 345/163 |
| 6,278,939 B1 * | 8/2001 | Robare et al. | 701/208 |
| 6,292,745 B1 * | 9/2001 | Robare et al. | 701/208 |

* cited by examiner

Primary Examiner—William A. Cuchlinski, Jr.
Assistant Examiner—Marthe Y. Marc-Coleman
(74) Attorney, Agent, or Firm—William G. Auton

(57) ABSTRACT

A global positioning system that actively guides blind pedestrians and military/police forces. This system uses DoD Global Positioning System (GPS) to provide user position and navigation to centimeter accuracy. Present position and navigation requests are digitally cellular telephoned to a central "base station" where data is correlated with a computerized map database which holds names and coordinates of specific locations, such as streets; intersections; traffic lights; hospitals; bathrooms; public telephones; and internal layouts of major buildings and facilities, in selected regions, cities, and neighborhoods. System operates by user entering desired destination into hand-held unit via voice recognition software or using Braille keyboard. Hand-held unit then transmits present position (PP) GPS satellite signals and desired destination to a base station which contains map database and surveyor quality GPS computer system.

1 Claim, 8 Drawing Sheets

GPS URBAN NAVIGATION SYSTEM FOR THE BLIND

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to navigation systems which calculate the position of the user using a GPS link, and more specifically to a GPS navigation system tailored for use by the visually impaired.

Finding one's exact location in an unfamiliar city has presented a problem. Discovering a location is even more challenging for the visually impaired. The visual clues used by sighted individuals in an unfamiliar place are useless to the blind pedestrian.

To provide the military with a location determination system, the U.S. Department of Defense (DoD) has devised a system that can very accurately locate any point in three-dimensional space. This system is known as the global positioning system (GPS).

There are twenty-four non-geosynchronous satellites circling the earth as part of a $12 billion DoD location determination system. An accurate location can be determined by measuring the distance to at least three satellites. Since the signals produced by the satellites are not classified by the military, civilian companies have produced portable GPS receivers for determining exact locations on the earth. A GPS receiver can pinpoint a location on the earth to within about 100 meters.

FIELD OF THE INVENTION

This invention relates to map positioning hardware for continuously establishing a user's geographical position and providing progressive vectors/directions to/within selected destinations or facilities by voice output and/or Braille map displays. Specifically, this invention is a reduced weight, extremely accurate global positioning active navigation system for both visually handicapped and DoD/police users. This device phonetically describes user's geographical position and provides phonic and/or braille vectors to/within selected destinations. It differs from ALL other GPS systems by its incorporation of digital cellular telephone link to a city/regional base station. The significant advantage is realized by: Marked weight reduction and bulk of the hand-held unit because GPS computations, map database, and voice recognition hardware and files are all relocated from hand-held unit to the base station; and centimeter system accuracy and reduced hardware costs because the entire network (hand-held units and base station) rely upon the base station's single survey-grade GPS system which has proven accuracy of 2–3 centimeters. With the survey-grade GPS system centrally located, redundancy of having one GPS computer per hand-held unit is eliminated.

The ability to accurately navigate is severely challenged by blindness and/or darkness, especially when the user is not familiar with his/her surroundings/environment. The advent of GPS systems such as Magellan Corporation's NeverLost automotive GPS system used by Hertz Rental Corporation has provided the foundation of this invention. Improving upon and applying this technology to the blind expands the world of travel freedom by allowing the blind to significantly expand the distance they can comfortably and safely traverse. The military, specifically ground forces whose tactics require light weight/extremely accurate navigation tools to operate in an urban environment will especially benefit from this invention while performing operations in strange/unknown urban surroundings. The ramifications of positional disorientation and/or inability to map read and navigate roads and within buildings, while leading combatants/equipment have proven to cause delays and loss of tactical advantage and initiative. This invention improves upon Magellan Corporation's NeverLost automotive GPS navigation system to the blind and military/police users. NeverLost correlates GPS coordinates with mapped locations and provides real-time directions/steering to selected addresses. Inventions such as U.S. Pat. No. 5,470,233 claim to capture the ability to keep the visually handicapped user informed of his/her GPS derived location, but it and others fail in their designs/claims to take the process to the next logical step of dramatically improving accuracy, significantly reducing weight and creating the ability to blindly navigate city streets and within major buildings/facilities. Therefore, applying centimeter accurate GPS system to create an active navigation system for the visually handicapped using digital cellular telephone links to a central base station is the essence of AF Invention AFB0017.

One of the best existing systems is described in the U.S. Pat. No. 5,470,223 issued to Fruchterman, which is incorporated herein by reference and which describes a GPS that helps a blind pedestrian navigate through a city. This system uses the DoD Global Positioning System and a Differential GPS receiver to determine a pedestrian's longitude and latitude. Once these coordinates have been determined, they are correlated with a computerized map database. The map database holds the names and coordinates of specific locations, such as intersections, in a particular region. The system of the Fruchterman invention retrieves the names of locations from the map database that are near the pedestrian. These names are then output to a voice synthesizer.

Other prior art systems are described in the following U.S. Patents, which are incorporated herein by reference:

U.S. Pat. No. 5,343,399 issued to Yokoyama et al;
U.S. Pat. No. 5,345,388 issued to Kashiwazaki;
U.S. Pat. No. 5,371,497 issued to Nimura et al;
U.S. Pat. No. 4,694,494 issue d to Woolfson;
U.S. Pat. No. 4,731,613 issued to Endo et al;
U.S. Pat. No. 5,032,836 issued to Ono et al;
U.S. Pat. No. 5,117,363 issued to Akiyama et al;
U.S. Pat. No. 5,119,301 issued to Shimizu et al;
U.S. Pat. No. 5,189,430 issued to Yano et al;
U.S. Pat. No. 5,225,842 issued to Brown et al.

While Fruchterman is excellent, it uses a voice system where city noise might obscure important information. The present invention uses a Braille display such as shown in the following patents, which are incorporated herein by reference:

U.S. Pat. No. 5,685,721, Nov. 11, 1997, Refreshable Braille-cell display implemented with shape memory alloys, Decker, Lawrence H.,
U.S. Pat. No. 5,580,251, Dec. 3, 1996, Electronic refreshable tactile display for Braille text and graphics, Gilkes, Alan M.,
U.S. Pat. No. 5,453,012, Sep. 26, 1995, Braille display, Hudecek,
U.S. Pat. No. 5,293,464, Mar. 8, 1994, Braille reading display terminal device, Hirano,
U.S. Pat. No. 5,244,288, Sep. 14, 1993, Method and apparatus for Braille display of information from CRT screen, Nagaoka.

SUMMARY OF THE INVENTION

Invention is a hand-held GPS for use by the blind and special forces working in urban areas under conditions of total darkness. Unit operates in similar fashion as typical GPS' with the main differences being in application and display. Application in total darkness and for use by blind is completely different from existing applications and is made possible by use of an active Braille display. The Braille display can function/present information in at least three modes: First and primary mode is audio directions; second is through basic Braille vectors on hand-held display; and third is a complex Braille topographic display on the hand-held display. Individual city, street, address, and major building layouts are programmed into the system's database. To ensure the highest accuracy, each city transmits a differential GPS signal that works in concert with satellite GPS signals. The user types in desired address or service (such as closest toilet, security, emergency exit, or telephone) via Braille keyboard. Database in concert with GPS signal provide user present position and vectors to selected location. Using audio vectors, voice database provides "turn left, turn right, distance to intersections, roads and intersections, user's current heading, and time to selected destination. The basic Braille vectors mode provides the user with Braille vector providing both magnitude and direction that is felt by the user. As the user approaches a turnpoint, the vector becomes shorter and shorter until the turnpoint or destination is reached. When the selected destination is reached the single point remaining from the vector pulses to let the user know he/she has arrived. The topographic Braille display is composed of a system similar to a CRT, but instead, the hard glass display is replaced with a soft iron oxide coated mylar type membrane. Details that would normally be projected/seen on the typical CRT are now three-dimensionalized against the flexible display membrane and can now be felt by the blind's Braille trained hands. In this manner, the "big picture" is provided to the user in the form of a map each can use to "feel" his/her way from origin to destination. Navigational safety functions that could be incorporated are audio and/or Braille warnings as user approaches streets.

This invention includes off the shelf software that runs a GPS navigation system for use by the visually impaired and/or DoD/police that accurately determines user geographic position and provides verbal and/or Braille vectors/directions to selected location(s). It is a hand-held GPS system for use by the blind and Special Forces/police working in urban areas/buildings requiring light weight/extremely accurate navigation capability. Unit operated in similar fashion as typical GPS hand held systems, with the main differences being in application, displays, and use of a base server (FIGS. 2 and 3). Application in total darkness and for use by blind is completely different from existing applications and is made possible by use of an active braille display (FIGS. 4 and 6). The Braille displays can function/present directional navigation vectors in at least three modes: First and primary mode is audio vectors; second is through basic Braille command vectors presented on the hand-held display (FIG. 4); and third is a complex Braille topographic display depicted on the hand-held display (FIG. 6). Individual city, street, address, and internal layouts of major buildings are programmed into the system's base station map database. To ensure the highest accuracy, the base station incorporates a survey-grade GPS system having a proven accuracy of 2–3 centimeters. The user enters desired address, or location (such as closest toilet, security, emergency medical, emergency exit, or telephone) into the system by typing or speaking (using voice recognition software interface). Invention in concert with map database and GPS signals provides user present position and vectors to the desired location through audio vector commands such as "turn left, turn right, distance to intersections, roads, stairways, etc." The basic braille vectors mode (FIG. 4) provides the user with braille vectors providing both distance and direction that the user feels with hand/fingers. The topographic braille display (FIG. 6) utilizes a modified cathode ray tube to present a moving map three dimensional topographic map of user present position and layout of path which lies in front of vector path to destination. Invention can incorporate enhanced features such as cellular telephone; weather forecast radio; and/or traffic light signal information.

DETAILED DESCRIPTION OF INVENTION

The invention is a hand-held GPS navigation system for the visually impaired and DoD/police operations. It utilizes survey-grade GPS to continuously identify user's position within 2–3 centimeters and provide users progressive vectors to and within selected destination(s). The system incorporates enhanced map database; system logic and basic hardware similar to that produced by Magellan NeverLost; and Braille displays and audio to provide vectors/directions to selected destination(s). There are four unique differences between this invention and NeverLost: First, this invention utilizes an innovative output display specifically designed for navigation without visual queues; second, this invention utilizes computerized voice recognition hard/software (such as Dragon Naturally Speaking) to input destination(s); third, the entire system is tailored to pedestrian use and stringent accuracy requirements Vs NeverLost's less detailed/less accurate vehicle application; and fourth, the system uses a digital cellular telephone linked base station to relocate all hand-held databases and GPS computing hardware. Additionally, this invention distinctly differs from invention depicted in U.S. Pat. No. 5,470,233, which utilizes less accurate GPS receiver hardware and voice output, but is described to only provide location information to the visually impaired user. AF invention 00517 significantly differs in that its design and main purpose is to provide centimeter accurate, light weight system that provides the user progressive navigational directions to the visually handicapped user, or DoD/police users operating under conditions of darkness and/or where light weight/extreme GPS accuracy is required.

Figure 2:
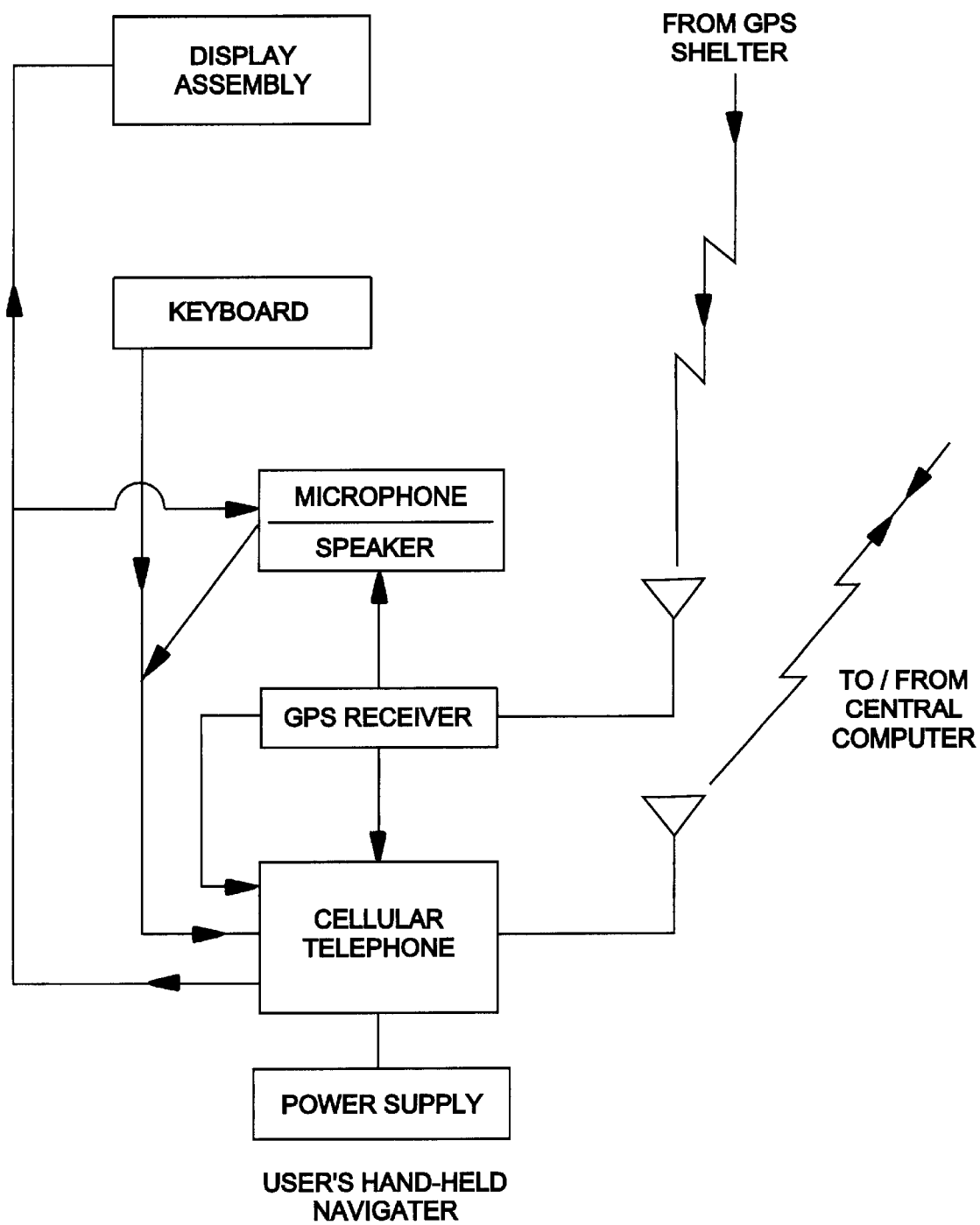
FIG. 2 depicts block diagram of system-hand-held unit and base server.
Figure 3:
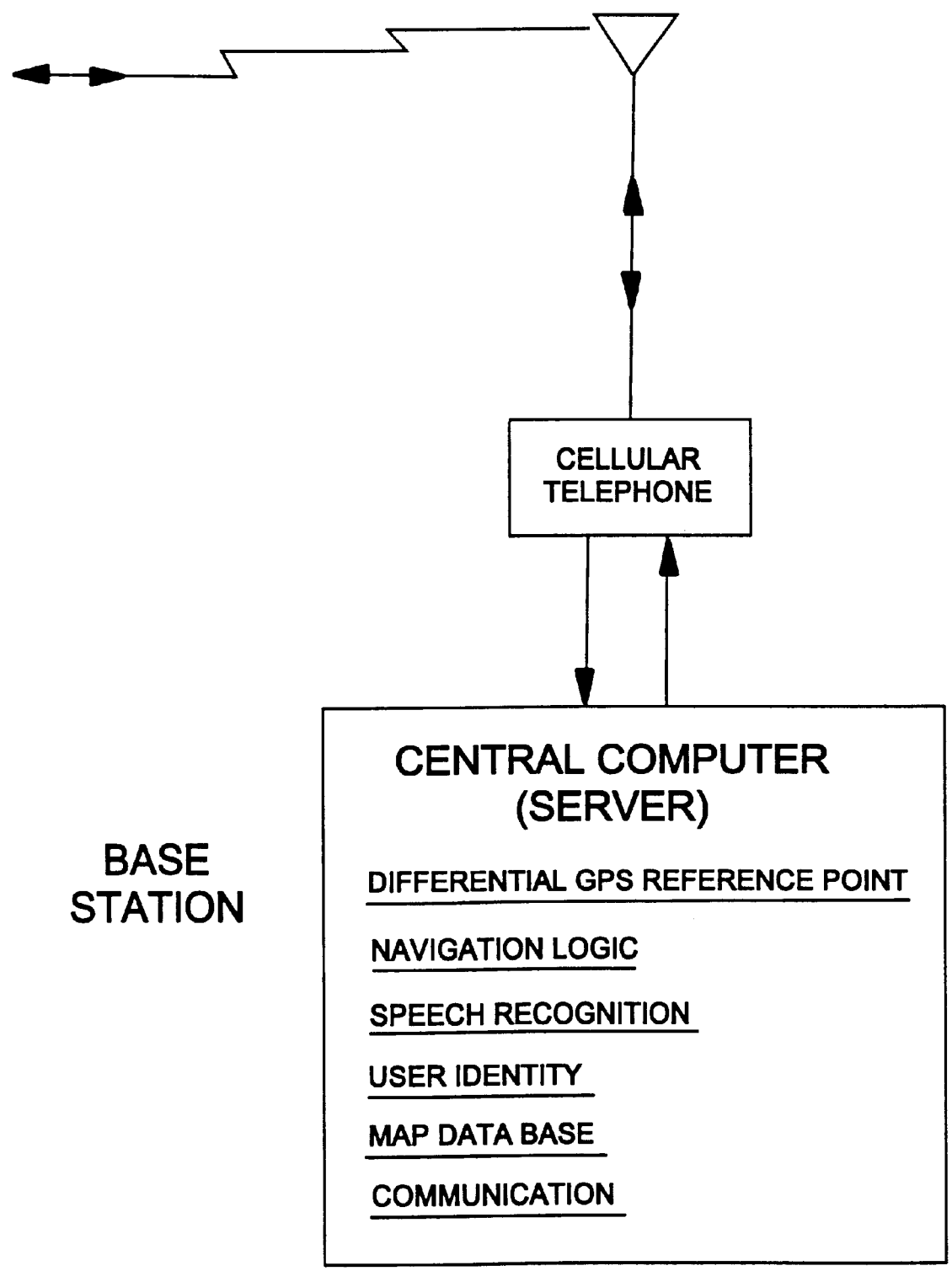
FIG. 3 depicts the system's cellular telephone interface flow diagram.
Figure 4:
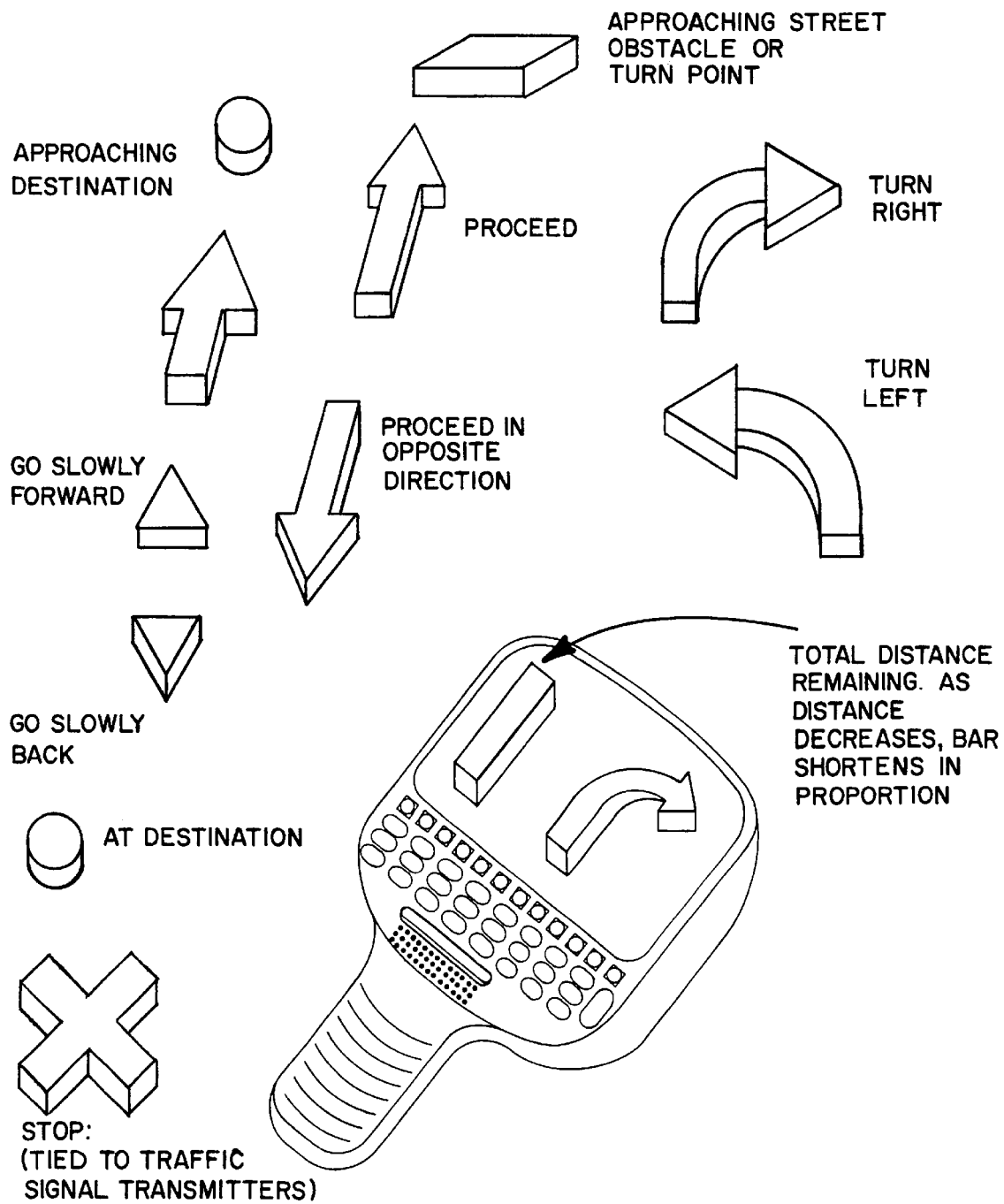
FIG. 4 depicts the system's Braille output display, command direction mode.
Figure 6:
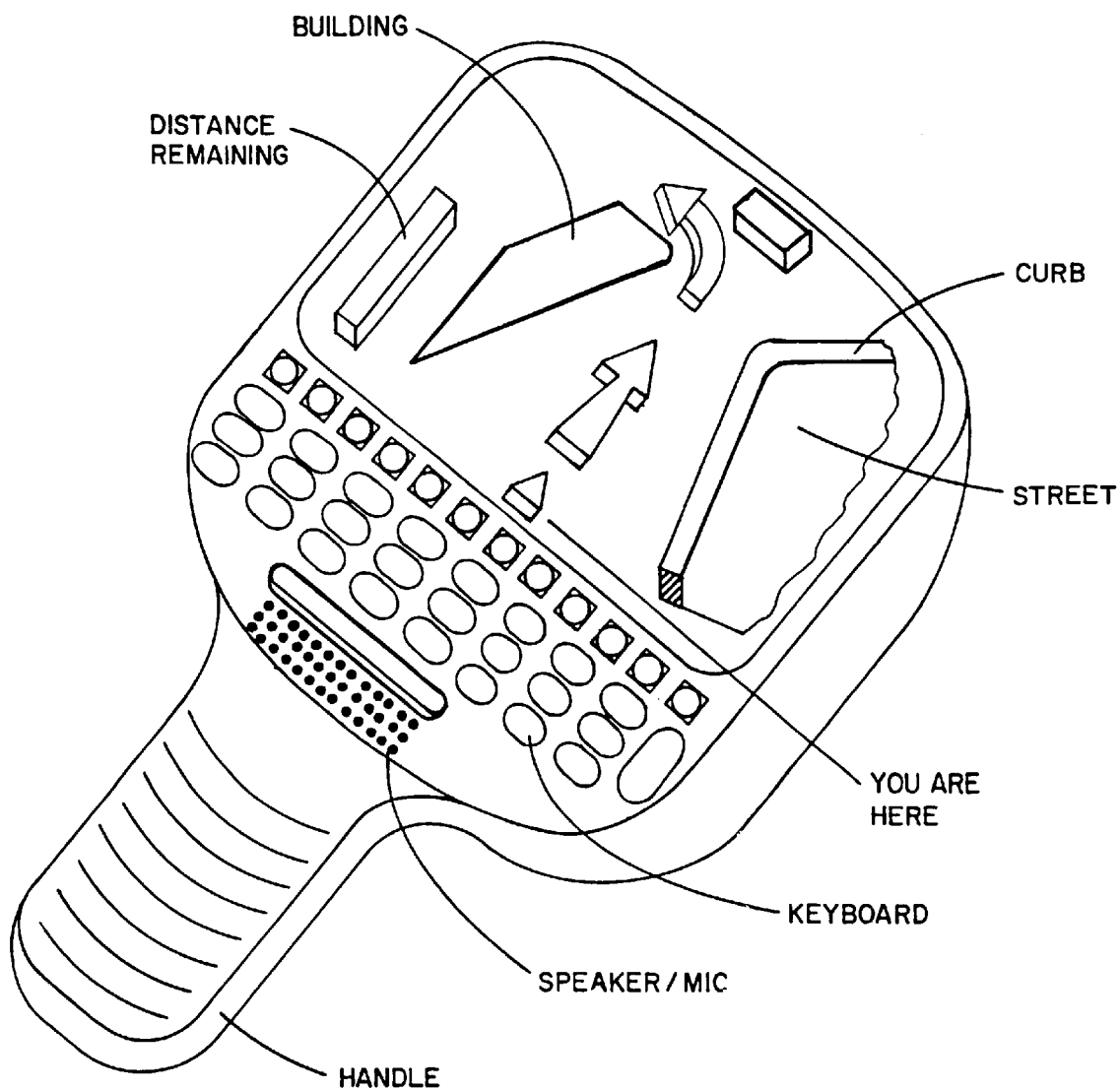
FIG. 6 depicts the system's Topographical Braille output display, command direction mode.

Invention takes advantage of, and incorporates technical features of both Magellan Corporation's NeverLost automotive GPS navigation technology and that of U.S. Pat. No. 5,470,233, and adds the following innovations:

Innovation 1: System takes full advantage of expansive digital cellular telephone network support in order to create a hand-held navigational unit that is centimeter accurate, small, light and easily operated. User's hand-held system (FIGS. 2 and 3) would be prohibitively heavy and cumbersome should it be required to self contain all the hardware required to support the computer, navigational databases, speech recognition and calculation software, GPS receiver, and display systems. All these capabilities with the exception of the GPS receiver, display systems, cellular telephone link/system interface are removed from the hand-held system and relocated to a central fixed location (base station) and linked to the hand-held units via digital cellular telephone signals. The user's hand-held unit receives GPS signals via its GPS receiver. This GPS signal data and desired destination are digitally cell phoned to the base station which contains the city's map database, voice recognition files and related software, and navigation plotting software. Base station recognizes user by his/her cell phone digital serial number and pulls up that user's specific voice recognition files. Base station plots user position (PP) and destination coordinates on its map database and calculates the best route of travel from PP to destination. The base station then progressively transmits this information to the user's hand-held unit as the user moves within the city and/or within major buildings/facilities. This information is received and displayed as depicted in FIGS. 4 and 6. The system continuously computes distances and directions as the user moves to, or even away from the selected destination and provides Braille and verbal queues to the user that he/she is straying from the optimum route (in similar fashion as that provided by NeverLost).

Innovation 2: Invention adds speech recognition software such as Dragon Systems Inc.'s 'Dragon Naturally Speaking' speech recognition software to allow users to select/input desired destinations through spoken commands such as, "Take me to the closest hospital emergency room." No new technology nor innovation is required in order to incorporate this feature since it is a proven/operational software program. It takes months to years for newly visually impaired persons to learn Braille. For this reason, application of speech recognition software makes this navigation breakthrough available to the visually impaired without having to first learn Braille.

Innovation 3: Innovation adds Braille output display, command direction mode that allows user to receive directions/vectors to selected destination, hear the directions and "feel" them on the Braille display. This is especially applicable to operating in high noise environment; by those who are additionally hearing impaired; and those military/police operations where silence is essential. It takes months to years for newly visually impaired persons to learn Braille. For this reason, application of simple command symbols and/or audio directions makes this navigation breakthrough available to the visually impaired without having to first learn Braille.

Figure 5:
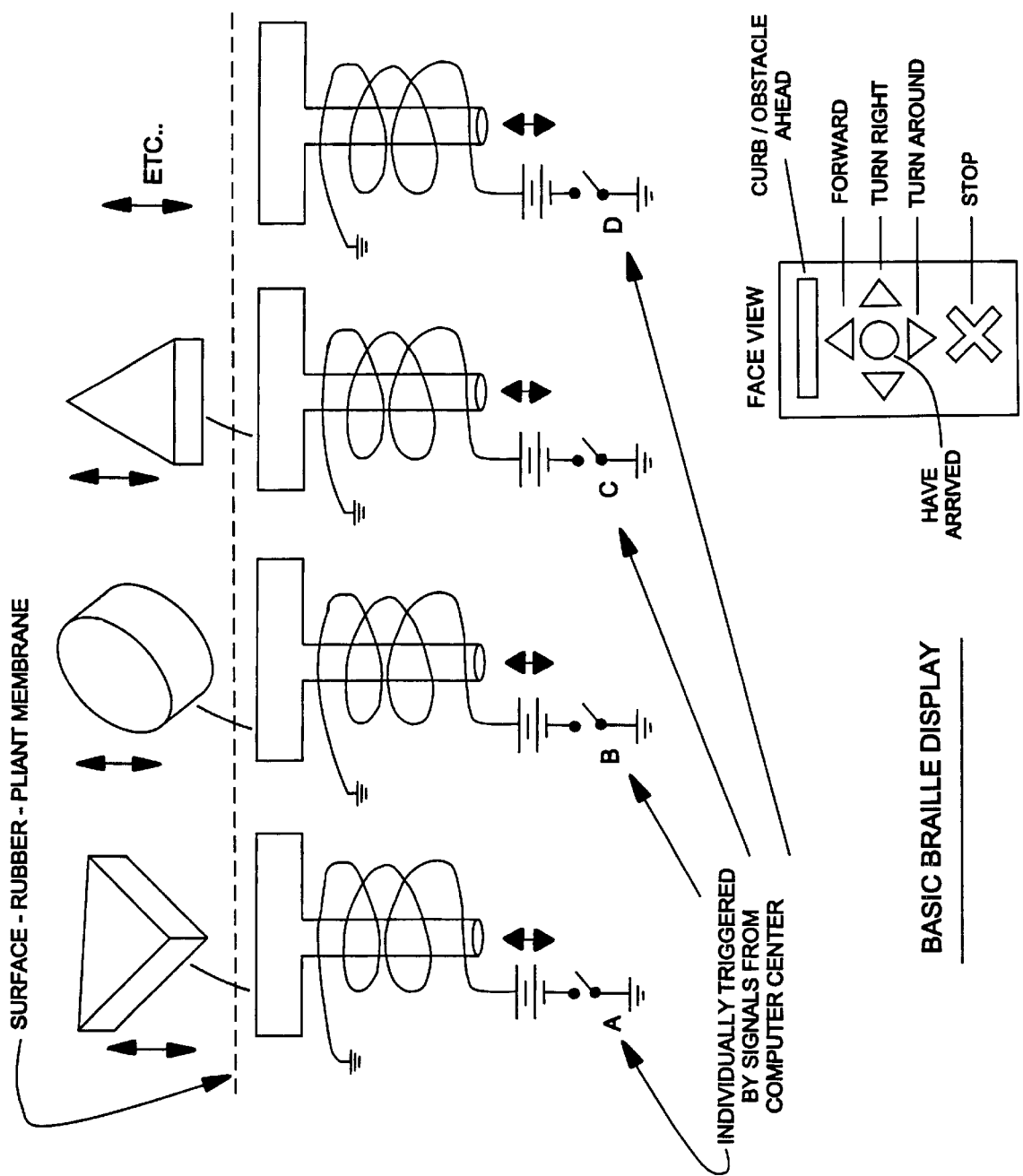
FIG. 5 depicts simplified schematic of the Braille output display's command direction mode.
Figure 7:
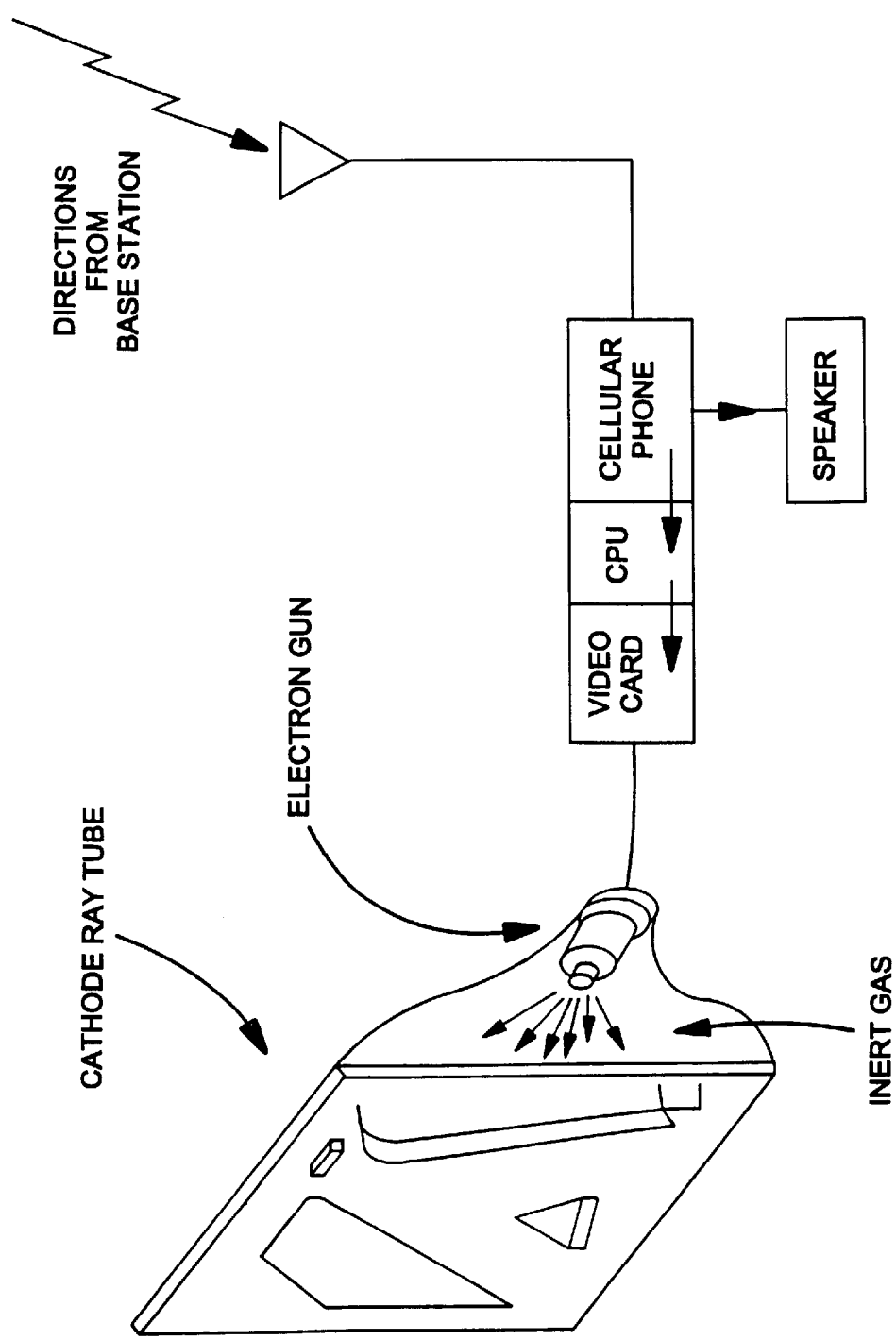
FIG. 7 depicts simplified operating concept of the system's Topographical Braille output Display.

Referring to FIG. 4, one sees the Braille output display, command direction mode and expanded sample of commands that can be presented to guide/direct the blind user. The user keeps his/her hand/fingers on the display and feels the command symbol that is raised beneath the display's flexible membrane. For example: the base station directs the user to turn right via the cellular telephone link to the hand-held unit. Referring to FIG. 5, the command signal is received by the hand-held unit and the appropriate symbol relay is energized and the right turn symbol is pushed against the display membrane, raising it slightly above the display's surface where it is felt by the user's hand/fingers. Once the user makes the right turn and starts walking, updated GPS position signals are cell phoned to the base station and the base station then transmits commands for the hand-held unit to replace the right turn symbol with the proceed forward symbol. Many command options are feasible. For instance, the system can make the proceed forward symbol pulse at different rates—slowly to direct the user to walk slowly, and faster pulsing to indicate to the user that he/she can safely walk at a fast pace. The proceed forward symbol could again slow to indicate that a change in direction or command is imminent. A further innovation enhancement to the Braille display is the topographical Braille output display. Referring to FIGS. 6 and 7, one sees the concept behind this innovation and the information the blind user gains from feeling information presented in this display mode. The hardware is similar to the basic television cathode ray tube (CRT), except the solid glass screen is replaced by a thin Mylar film coated on the electron gun side with similar coating as the television screen. The tube is filled with inert gas versus the vacuum utilized in the television CRT. The theory of operation is the Braille display's screen membrane is radiated by its electron gun just as the television CRT does. However, instead of the user seeing an actual picture on a television glass screen, the blind user feels the picture with hand/fingers as the electron beam distorts the Mylar membrane into a three-dimensional topographical picture. Applying this technology to the hand-held unit's display is accomplished in the following manner/example: The GPS and communications process of the invention remains the same, but the information from the base station to user's hand-held unit changes constantly as the user progresses over his/her route of travel to any given destination. The base station transmits user's present position to the hand-held unit, which is depicted on the topographic display at bottom-center (see FIG. 7), and the terrain/city street/sidewalk layout immediately in front of the user out to nominally 50 feet. Here, the user feels on the topographic display what his/her eyes would see if able to look down the street/hallway he/she is traveling. In essence, this gives navigational eyes to the blind user. Assuming the user is being directed to proceed straight ahead and then turn right on the sidewalk 25 feet in front of him/her, the topographic display would also present a "proceed forward" arrow on the display immediately in front of the user's present position marker, and a "turn right" arrow at the sidewalk depicted halfway up the topographic display screen. Again, the topography presented to be felt on the screen changes in real time as the user proceeds and his/her present position changes.

Innovation 4: Innovation adds enhanced destination database that includes key locations such as hospital emergency rooms; public toilets and telephones—facilities especially beneficial to the blind user.

Invention is a hand-held GPS for use by the blind and special forces working in urban areas under conditions of total darkness. Unit operates in similar fashion as typical GPS' with the main differences being in application and display. Application in total darkness and for use by blind is completely different from existing applications and is made possible by use of an active Braille display. The Braille display can function/present information in at least three modes: First and primary mode is audio directions; second is through basic Braille vectors on hand-held display; and third is a complex Braille topographic display on the hand-held display. Individual city, street, address, and major building layouts are programmed into the system's database. To ensure the highest accuracy, each city can transmit a differential GPS signal that works in concert with satellite GPS signals.

Figure 1:
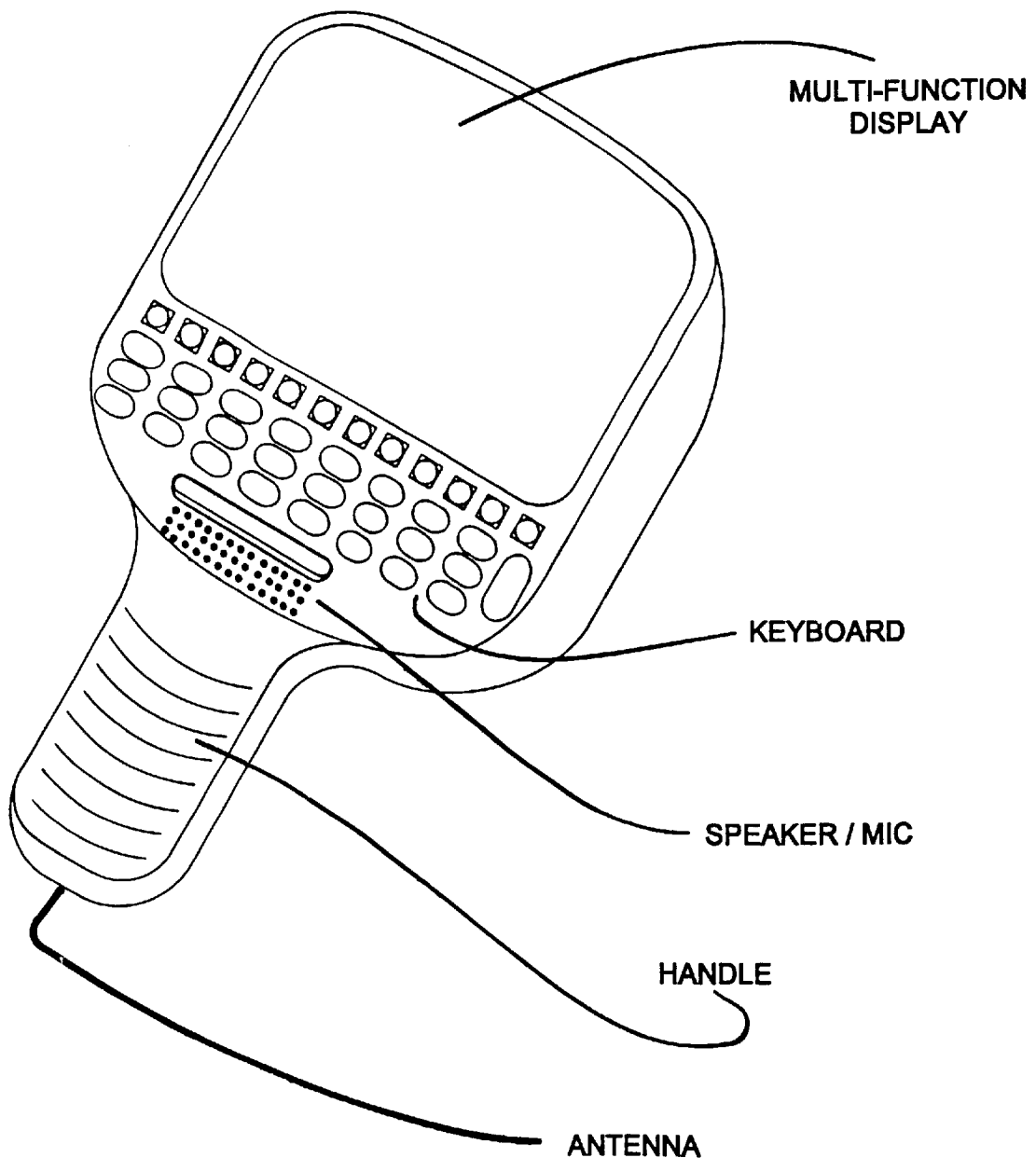
FIG. 1 is an illustration of the hand-held unit of the present invention.
Figure 8:
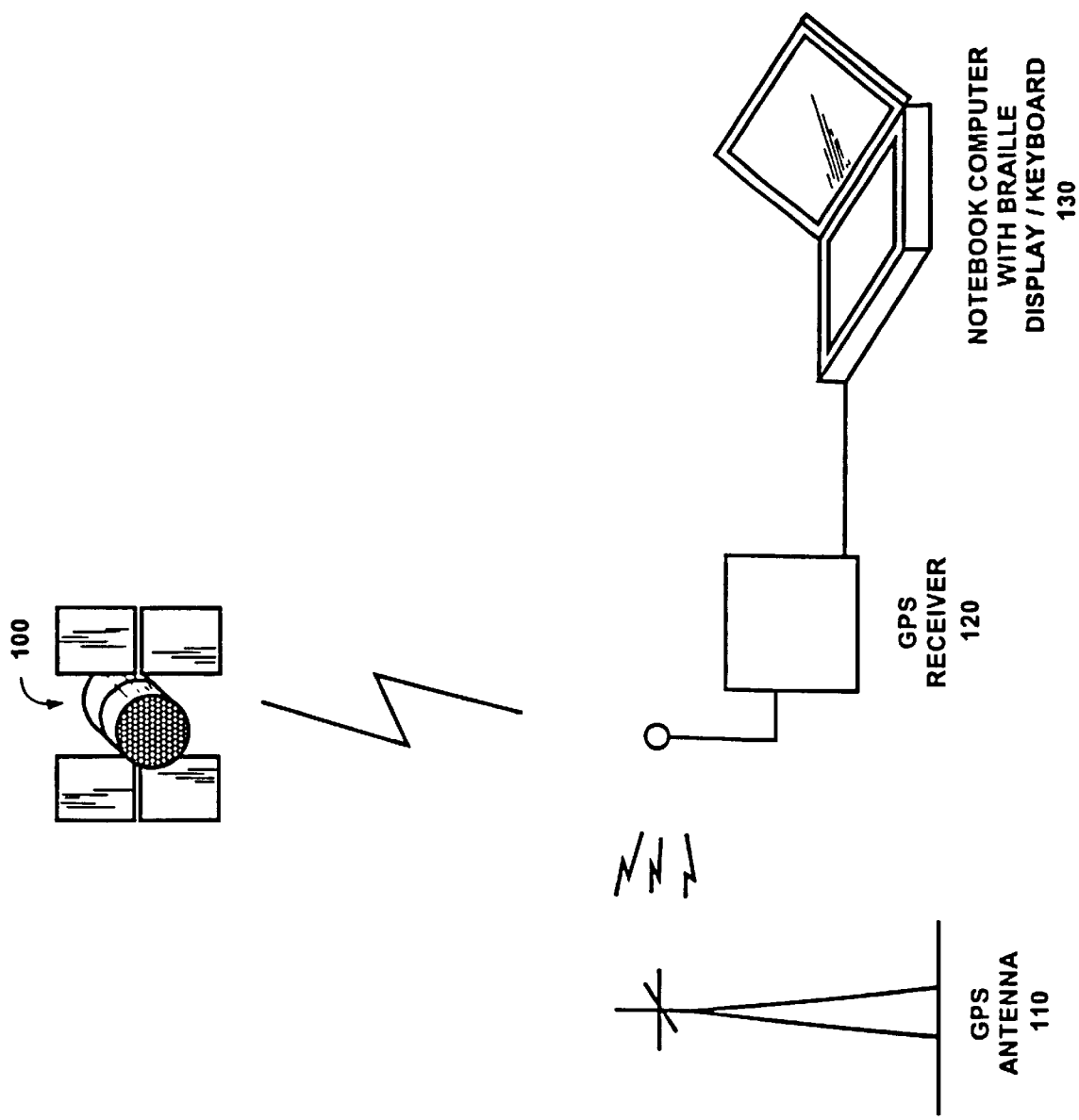
FIG. 8 is an illustration of the elements of the invention.

FIG. 8 is an illustration of the elements used in the present invention and includes: a GPS satellite 100, GPS receiver 120, a portable computer notebook with Braille display/keyboard 130 and an optional local GPS antenna input system 110. The system of FIG. 1 uses many of the elements of the above-cited Fruchterman et al patent, but uses the Braille computers of Gilkes, Decker, Hirano, and Nagaoka.

The user types in desired address or service (such as closest toilet, security, emergency exit, or telephone) via Braille keyboard. Database in concert with GPS signal provide user present position and vectors to selected location. Using vectors, a database provides "turn left, turn right, distance to intersections, roads and intersections, user's current heading, and time to selected destination. The basic Braille vectors mode provides the user with Braille vector providing both magnitude and direction that is felt by the user. As the user approaches a turnpoint, the vector becomes shorter and shorter until the turnpoint or destination is reached. When the selected destination is reached the single point remaining from the vector pulses to let the user know he/she has arrived. The topographic Braille display is composed of a system similar to a CRT, but instead, the hard glass display is replaced with a soft iron oxide coated mylar type membrane. Details that would normally be projected/seen on the typical CRT are now three-dimensionalized against the flexible display membrane and can now be felt by the blind's Braille trained hands. In this manner, the "big picture" is provided to the user in the form of a map each can use to "feel" his/her way from origin to destination. Navigational safety functions that could be incorporated are Braille warnings as user approaches streets.

As shown in FIG. 8, satellites generate a signal that is received by a GPS receiver. These receivers are well known in the art, and can be purchased from companies such as Trimble Navigation (San Jose, Calif.). The Trimble Mobile GPSTM is a GPS interface for a notebook computer. A GPS receiver thereby gathering FM sideband signals indicating the GPS corrections that are broadcast by a DGPS antenna. The GPS receiver interfaces with a Notebook computer via a standard laptop PCMCIA slot. The GPS receiver transfers the corrected satellite signals into the notebook computer. The notebook computer preferably contains an INTEL 80486 microprocessor. The Sextant software of the present invention records the GPS longitude/latitude coordinates and compares them with a stored digital map. Digital maps, such as those available from Etak Incorporated, are well known in the art. Normally, a single map database covers a specific geographical region, such as California. A suite of maps is available that cover virtually the entire world.

The name of the map point nearest the retrieved satellite coordinate and appropriate for a blind pedestrian is retrieved. Any features, such as name, address or business hours are then sent to a Braille display, which speaks the features. The Braille display is preferably one similar to that cited in the Hirano patent but the computer may also include the voice synthesizer used in the excellent Fruchterman patent cited above.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A GPS navigation system for the visually impaired, which comprises:

a portable GPS receiver which receives GPS coordinates, wherein said portable GPS receiver further comprises a digital cellular telephone which provides a communication link;

a computer which determines a pedestrian's location from the GPS coordinates of the GPS receiver, wherein said computer comprises a survey-grade GPS raw data processor to obtain centimeter accuracy;

a base server with detailed metropolitan navigation data which is accessible to the portable GPS receiver; and an active Braille display which produces tactile outputs of the pedestrian's position, wherein said active Braille display produces a topographic three-dimensional map that the user feels on the display.

* * * * *